(12) United States Patent
Jeon et al.

(10) Patent No.: US 10,216,876 B2
(45) Date of Patent: Feb. 26, 2019

(54) SIMULATION SYSTEM ESTIMATING SELF-HEATING CHARACTERISTIC OF CIRCUIT AND DESIGN METHOD THEREOF

(71) Applicants:Jongwook Jeon, Suwon-si (KR); Yeoil Yun, Hwasung (KR); Sangwoo Pae, Seongnam-si (KR); Uihui Kwon, Hwaseong-si (KR); Keunho Lee, Seongnam-si (KR)

(72) Inventors: Jongwook Jeon, Suwon-si (KR); Yeoil Yun, Hwasung (KR); Sangwoo Pae, Seongnam-si (KR); Uihui Kwon, Hwaseong-si (KR); Keunho Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 721 days.

(21) Appl. No.: 14/828,686

(22) Filed: Aug. 18, 2015

(65) Prior Publication Data
US 2016/0048622 A1 Feb. 18, 2016

(30) Foreign Application Priority Data
Aug. 18, 2014 (KR) .................. 10-2014-0107135

(51) Int. Cl.
*G06F 17/50* (2006.01)
(52) U.S. Cl.
CPC ...... *G06F 17/5036* (2013.01); *G06F 2217/80* (2013.01)

(58) Field of Classification Search
CPC .................. G06F 17/5036; G06F 2217/80
USPC .......................................... 703/14
See application file for complete search history.

(56) References Cited

U.S. PATENT DOCUMENTS

| | | | |
|---|---|---|---|
| 7,191,413 B2 | 3/2007 | Chandra et al. |
| 7,347,621 B2 | 3/2008 | Sri-Jayantha et al. |
| 7,366,997 B1 | 4/2008 | Rahmat et al. |
| 7,401,304 B2 | 7/2008 | Li et al. |
| 7,472,363 B1 | 12/2008 | Chandra |
| 7,823,102 B2 | 10/2010 | Chandra et al. |
| 7,941,779 B2 | 5/2011 | Rahmat et al. |
| 8,082,137 B2 | 12/2011 | Li et al. |
| 8,093,502 B2 | 1/2012 | Mikado et al. |
| 8,104,006 B2 | 1/2012 | Kariat et al. |
| 8,106,381 B2 | 1/2012 | Atanackovic |
| 8,286,111 B2 | 10/2012 | Chandra et al. |
| 8,365,131 B2 | 1/2013 | Koushanfar et al. |

(Continued)

OTHER PUBLICATIONS

Eric Pop et al, 'Thermal Analysis of Ultra-Thin Body Device Scaling', 0-7803-7873-3/03/$17.00 (c) 2003 IEEE, pp. 1-4.

*Primary Examiner* — Saif A Alhija
(74) *Attorney, Agent, or Firm* — Volentine, Whitt & Francos, PLLC

(57) ABSTRACT

A method of designing a semiconductor circuit using a circuit simulation tool executed by a computer includes calculating power consumptions of elements of the semiconductor circuit by use of the circuit simulation tool. A thermal netlist is created about the semiconductor circuit, based on the power consumptions and geometry information of each of the elements. A simulation of the semiconductor circuit is performed with the thermal netlist using the circuit simulation tool to detect a temperature of each of the elements. The thermal netlist includes thermal capacitance information of each of the elements.

13 Claims, 17 Drawing Sheets

(56) References Cited

U.S. PATENT DOCUMENTS

| | | |
|---|---|---|
| 8,504,958 B2 | 8/2013 | Kariat et al. |
| 8,539,408 B1 | 9/2013 | Cheng et al. |
| 2009/0024347 A1* | 1/2009 | Chandra ................ G01K 7/425 |
| | | 702/130 |
| 2009/0024969 A1 | 1/2009 | Chandra |
| 2009/0224356 A1 | 9/2009 | Chandra |
| 2013/0103351 A1 | 4/2013 | Huang et al. |

* cited by examiner $V = I \times Re$ $\quad\quad\quad\quad \Delta T = Q \times Rth$ $V = I \times Re$ $\quad\quad\quad\quad \Delta T(t) = \Delta T(1 - e^{-\frac{t}{Rth \times Cth}})$

500'

SIMULATION SYSTEM ESTIMATING SELF-HEATING CHARACTERISTIC OF CIRCUIT AND DESIGN METHOD THEREOF

CROSS-REFERENCE TO RELATED APPLICATIONS

A claim for priority under 35 U.S.C. § 119 is made to Korean Patent Application No. 10-2014-0107135 filed Aug. 18, 2014, in the Korean Intellectual Property Office, the entire contents of which are hereby incorporated by reference.

BACKGROUND

The technology described herein relates to the design of semiconductor circuits, and more particularly, relates to a simulation system for estimating a self-heating characteristic of a circuit.

In general, a schematic circuit is designed by a schematic tool to design a semiconductor integrated circuit. The schematic circuit denotes elements included in the semiconductor integrated circuit and a connection relationship among the elements. Next, the elements of the schematic circuit are designed with patterns of material layers, such as a conductive layer, a semiconductor layer, and an insulation layer. Then, a semiconductor integrated circuit with a needed function is designed through iterative deposition and patterning of the material layers, based on the layout that is created, such that patterns are disposed vertically and horizontally.

After the schematic circuit of the semiconductor integrated circuit is created by the schematic tool, an operation of the semiconductor integrated circuit is tested by simulating a netlist, provided by the schematic tool, by use of a simulation device. The schematic circuit is revised when the simulation result is not acceptable.

Self-heating of circuits is an issue in designing a circuit for a mobile device. The self-heating influences device performance and reliability. For this reason, a design analysis environment needs to be constructed to optimize a circuit design considering the self-heating characteristic. It is possible to use a dedicated simulator for heat analysis of a designed circuit. However, the heat analysis of the schematic circuit at an early design phase is not practical in terms of time and cost.

Thus, an analysis environment is urgent which allows a circuit designer to optimize a circuit by use of a heat analysis result.

SUMMARY

One aspect of embodiments of the application is directed to provide a method of designing a semiconductor circuit using a circuit simulation tool executed by a computer. The method includes calculating power consumptions of elements of the semiconductor circuit by use of the circuit simulation tool; creating a thermal netlist about the semiconductor circuit, based on the power consumptions and geometry information of each of the elements; and performing a simulation of the operation of the semiconductor circuit with the thermal netlist using the circuit simulation tool to detect a temperature of each of the elements. The thermal netlist includes thermal capacitance information of each of the elements.

Another aspect of embodiments of the application is directed to provide a method of designing a semiconductor circuit using a circuit simulation tool executed by an information processing device. The method includes receiving a first netlist of the semiconductor circuit and material and geometry information of elements included in the semiconductor circuit; conducting a first simulation of the operation of the semiconductor circuit with the first netlist using the circuit simulation tool; creating a second netlist corresponding to a thermal circuit of the semiconductor circuit based on at least one of power consumptions of the elements generated according to the first simulation, the material information, and the geometry information; performing a second simulation operation of the semiconductor circuit with the second netlist using the circuit simulation tool to detect temperature variations of the elements; and revising the first netlist based on the detected temperature variations to create a third netlist. The thermal circuit includes a thermal capacitance parameter for detecting the temperature variations of the elements dynamically.

Still another aspect of embodiments of the application is directed to provide a computer-based system which simulates a semiconductor circuit. The computer-based system includes an input/output device, a working memory, and a central processing unit. The input/output device is adapted to receive an electric netlist of the semiconductor circuit, geometry information of elements included in the semiconductor circuit, and material characteristic information of the elements. The working memory is adapted to load a simulation program. The central processing unit is adapted to execute the simulation program based on information provided from the input/output device. The simulation tool includes a simulation tool adapted to verify an electric circuit characteristic of the semiconductor circuit; and a simulation control module adapted to call the simulation tool, to make the simulation tool calculate a power consumption using the electric circuit netlist, to create a thermal netlist of the semiconductor circuit depending on the calculated power consumption, the geometry information, and the material characteristic information, and to make the simulation tool simulate operation of the semiconductor circuit with the thermal netlist and to output thermal circuit characteristics of the elements.

Still another aspect of embodiments of the application is directed to a method, executed by a computer running a simulation program, of simulating an electrical circuit. The method includes simulating an electrical operation of the circuit, using an electrical representation of the circuit, to identify a power dissipation of each of a plurality of elements of the circuit. A thermal representation of each of the elements is generated based on the identified power dissipation and characteristics of the elements.

In an exemplary embodiment, the method further includes simulating a thermal operation of the circuit based on the thermal representation of each of the elements and the identified power dissipations.

In an exemplary embodiment, the method further includes generating a temperature characteristic for each of the elements based upon the simulation of the thermal operation.

In an exemplary embodiment, the method further includes simulating another electrical operation of the circuit using the electrical representation of the circuit and the generated temperature characteristics of the elements.

In an exemplary embodiment, the method further includes identifying a performance degradation of one or more of the elements from the simulation of the circuit's electrical operation using the electrical representation of the circuit and the generated temperature characteristics of the elements.

In an exemplary embodiment, the thermal representation of each of the elements comprises a thermal resistance that indicates a temperature difference across the element for the identified power dissipation through the element.

In an exemplary embodiment, the thermal representation of each of the elements further comprises a thermal capacitance. The thermal capacitance and the thermal resistance indicate a variation of the temperature difference with time.

In an exemplary embodiment, the thermal operation is simulated by substituting the thermal representation of each of the elements for an electrical representation of the element in a repetition of the electrical operation simulation.

BRIEF DESCRIPTION OF THE FIGURES

The above and other objects and features will become apparent from the following description, with reference to the following figures, wherein like reference numerals refer to like parts throughout the various figures unless otherwise specified, and wherein.

DETAILED DESCRIPTION

Figure 1A:
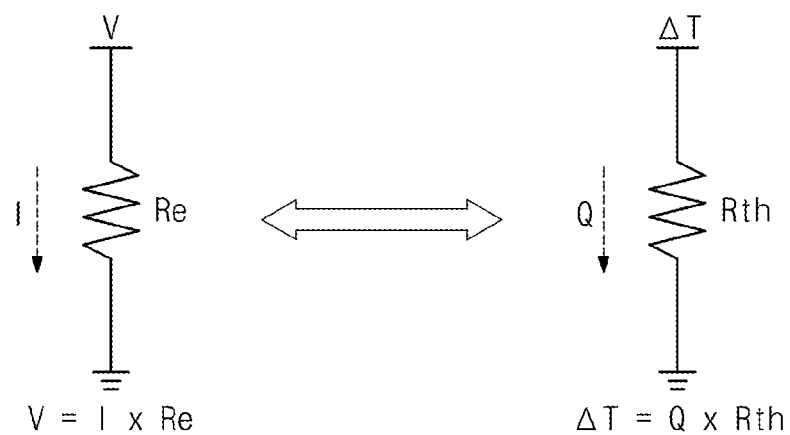
FIGS. 1A and 1B are diagrams showing a correspondence relationship between an element of an electric circuit and a thermal circuit, according to an embodiment of the application.

Embodiments will be described in detail with reference to the accompanying drawings. The application, however, may be embodied in various different forms, and should not be construed as being limited only to the illustrated embodiments. Rather, these embodiments are provided as examples so that this disclosure will be thorough and complete, and will fully convey the concept of the application to those skilled in the art. Accordingly, known processes, elements, and techniques are not described with respect to some of the embodiments of the application. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the application.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1B:
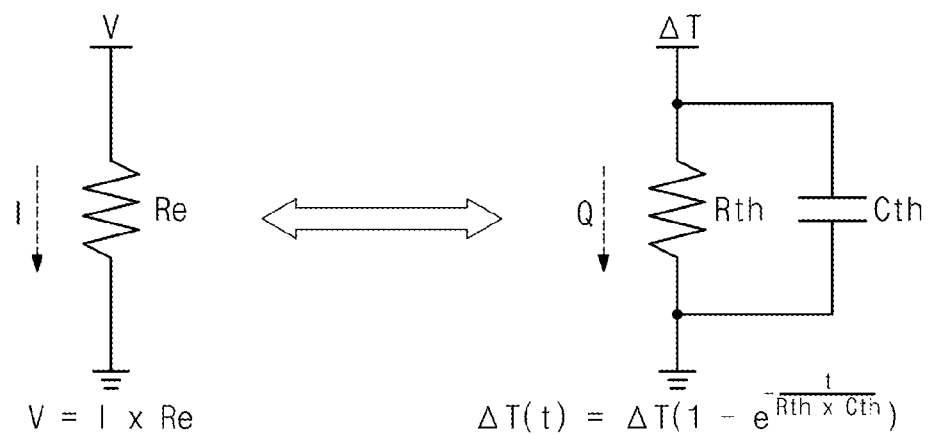

FIGS. 1A and 1B are diagrams showing a correspondence relationship between an element of an electric circuit and a thermal circuit, according to an embodiment of the application. FIG. 1A shows an embodiment where an electric resistance is modeled with a thermal resistance. FIG. 1B shows an embodiment where an electric resistance is modeled with a thermal resistance and a thermal capacitance.

Referring to FIG. 1A, an electric circuit about a resistance Re is analyzed in compliance with an ohm's law. That is, a voltage V applied to the resistance Re is expressed by the product of the resistance Re and current I flowing through the resistance Re. The following equation 1 shows this relationship.

$$V = I \times Re \quad (1)$$

The thermal circuit about a thermal resistance Rth is analyzed in compliance with Fourier's law. That is, a temperature difference ΔT between both ends of the thermal resistance Rth is expressed by the product of power dissipation Q and the thermal resistance Rth. The following equation 2 shows this relationship.

$$\Delta T = Q \times Rth \quad (2)$$

In the equation 2, the power dissipation Q may be used as a parameter of the thermal circuit and the electric circuit. That is, for electric energy consumed by the resistance Re of the electric circuit, the power (P=I²Re) may correspond to the power dissipation Q of the thermal circuit with a characteristic similar to current.

FIG. 1B shows another relationship between the electric circuit and the thermal circuit. Referring to FIG. 1B, a voltage across the electric resistance Re or current flowing through the electric resistance Re is analyzed through equation 1. In some cases, the thermal circuit needs to be analyzed by use of a time function.

When a capacitance C and a resistance R of an electric circuit are connected in series or in parallel, a voltage V(t) may be a function of a time. That is, a voltage is expressed by an equation to which both a steady state and a transient state are applied. Thus, the magnitude of V(t) may be determined depending on the magnitude of the capacitance C. A variation in the voltage V(t) due to the capacitance C may be gradual with respect to the time. This characteristic may be used to describe the physical characteristic that a temperature variation is slower than an applied power in the thermal circuit.

The above-described characteristic is applied to the thermal circuit, which is expressed as shown in the following equation 3.

$$\Delta T(t) = \Delta T(1 - e^{-\frac{t}{Rth \times Cth}}) \quad (3)$$

The thermal circuit may further include a passive element, such as a thermal capacitance Cth, for analyzing a self-heating phenomenon dynamically. That is, the thermal circuit shown in FIG. 1B makes it possible to analyze a thermal characteristic about a transient state. Here, a time constant τ (=Rth×Cth) that denotes a variation in temperature due to the thermal capacitance Cth is used. That is, it is possible to express the phenomenon that a relative variation in temperature is slow with respect to a power-applied time, by use of an equation expressing the transient phenomenon. A correspondence relationship between the electric resistance and the thermal resistance or between the electric resistance and the thermal resistance/thermal capacitance may suggest that a thermal circuit is simulated using an electric circuit simulation tool.

Further, it is possible to analyze a self-heating-based temperature characteristic of a circuit by setting the magnitude of the thermal capacitance Cth. The magnitude of the thermal capacitance Cth may be determined depending on a measured value about various thermal characteristics of an element, an experimental value, or geometry information of the element. Thus, a dynamic characteristic of a thermal circuit is also estimated through a simulation tool of the electric circuit.

Figure 2A:
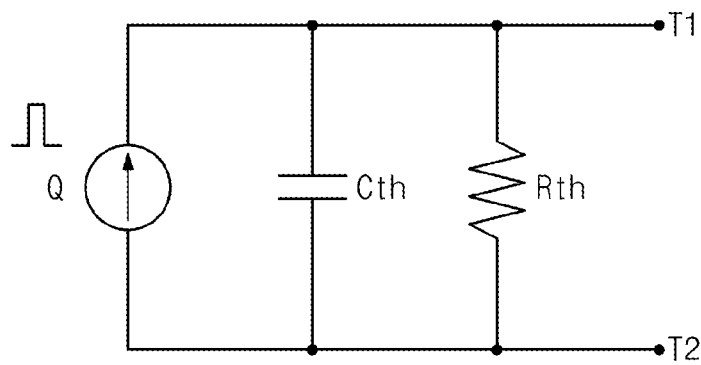
FIGS. 2A and 2B are diagrams schematically illustrating a thermal circuit analysis method according to an embodiment of the application.
Figure 2B:
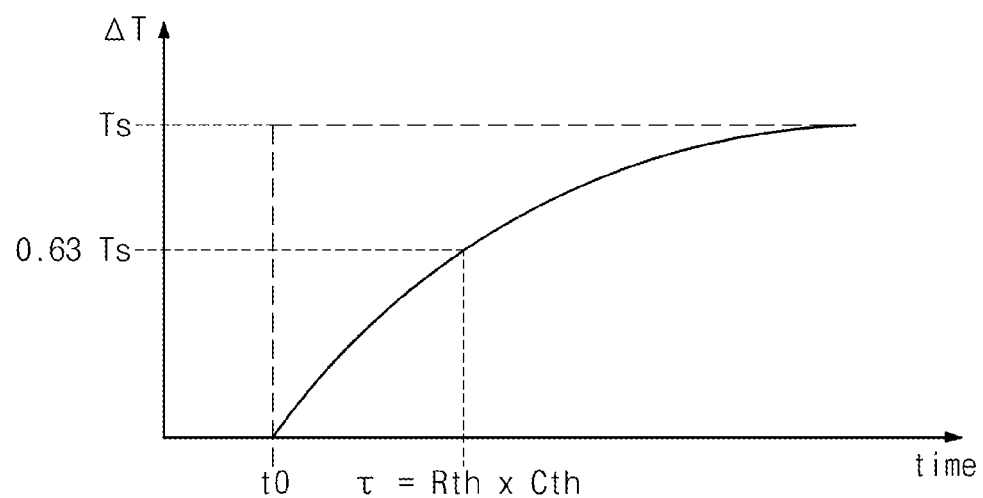

FIGS. 2A and 2B are diagrams schematically illustrating a thermal circuit analysis method according to an embodiment of the application. FIG. 2A is a thermal circuit diagram for describing a dynamic thermal characteristic due to self-heating, and FIG. 2B is a timing chart schematically illustrating a temperature characteristic of FIG. 2A.

Referring to FIG. 2A, a thermal circuit of which the thermal conduction is denoted by an electric equivalent circuit is described through a parallel connection of a thermal resistance Rth and a thermal capacitance Cth. For electrical power practically consumed by an element, a power Q is described as being substantially identical to a current source of an electric circuit. The thermal resistance Rth acts as a resistance to thermal conduction in an element. That is, as the thermal resistance Rth becomes larger, the thermal barrier effect may become higher. In a transistor, self-heating of a channel area shielded by a material having a large thermal resistance Rth affects operating reliability of an element. The thermal capacitance Cth is modeled as a capacitor of an electric circuit for a temperature variation.

FIG. 2B is a graph showing a temperature characteristic of a thermal circuit shown in FIG. 2A. Referring to FIG. 2B, even though power dissipation Q is a function of a square wave, a variation in a temperature difference ΔT (=T1−T2) across each of a thermal resistance Rth and a thermal capacitance Cth is smooth. For example, a time constant τ that allows the temperature difference reaches about 63% of a steady state Ts, is expressed by the product (Rth×Cth) of the thermal resistance Rth and the thermal capacitance Cth. The magnitudes of the thermal resistance Rth and the thermal capacitance Cth for creating the thermal netlist of a circuit are determined considering the above-described relationship.

Figure 3:
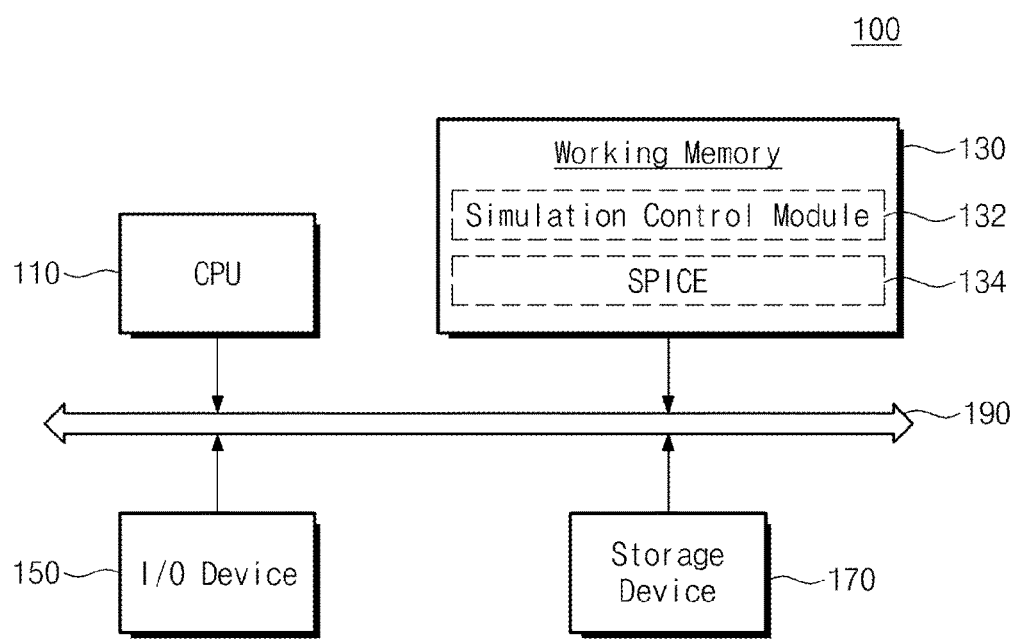
FIG. 3 is a block diagram schematically illustrating a simulation system according to an embodiment of the application.

FIG. 3 is a block diagram schematically illustrating a simulation system 100 according to an embodiment of the application. Referring to FIG. 3, a simulation system 100 contains a central processing unit (CPU) 110, a working memory 130, an input/output device 150, and a storage device 170. The simulation system 100 may be a dedicated device for circuit and thermal analysis, but it may be implemented with a computer including a SPICE simulation program.

The CPU 110 executes software to be executed on the simulation system 100: an application program, an operating system, and device drivers. The CPU 110 may execute an operating system OS (not shown) loaded on the working memory 130. The CPU 110 may execute OS-based application programs. For example, the CPU 110 executes a simulation control module 132 and a SPICE (Simulation Program with Integrated Circuit Emphasis) program 134 that are loaded on the working memory 130. An embodiment of the application is exemplified as the SPICE program 134 is used as a tool for simulating an electric circuit. However, the scope and spirit of the application may not be limited thereto. A variety of electric circuit simulation tools may be used to simulate an electric circuit or a thermal circuit.

An operating system OS or application programs are loaded on the working memory 130. Upon booting of the simulation system 100, an OS image (not shown) stored at the storage device 170 may be loaded onto the working memory 130 according to a booting sequence. The operating system OS may support all input/output operations of the simulation system 100. Likewise, application programs that are selected by a user or provide a basic service may be loaded on the working memory. In particular, the simulation control module 132 and the SPICE program 134 are also loaded on the working memory 130 from the storage device 170 to perform thermal analysis according to an embodiment of the application. The SPICE program 134 is an example of a circuit simulation program, and the scope and spirit of the application may not be limited thereto.

The working memory 130 may be a volatile memory, such as a static RAM (SRAM) or a dynamic RAM (DRAM), or a nonvolatile memory, such as PRAM, MRAM, ReRAM, FRAM, or NOR flash memory.

The simulation control module 132 conducts circuit analysis and thermal analysis according to an embodiment of the application. In particular, the simulation control module 132 analyzes an electric circuit, based on the electric netlist of a circuit received according to a predetermined procedure. The simulation control module 132 creates the thermal netlist depending on power dissipation and geometry information of each element calculated through analyzing the electric circuit. The simulation control module 132 has the SPICE program 134 conduct thermal netlist-based simulation. The simulation control module 132 estimates a temperature value about each node of the thermal circuit due to self-heating, based on the thermal analysis conducted by the SPICE program 134. The simulation control module 132 simulates an electric circuit, to which the self-heating is applied, by additionally simulating an electric circuit to which a temperature increase or decrease of a circuit is applied depending on the thermal analysis.

The input/output device 150 controls user input and output from user interface devices. For example, the input/output device 150 includes a keyboard and a monitor and receives an electric netlist file or geometry information of various elements. The input/output device 150 displays processes and results of simulation operations of the simulation system 100.

The storage device 170 may be a storage medium of the simulation system 100. The storage device 170 stores application programs, an OS image, and a variety of data. The storage device 170 may be implemented with a memory card (e.g., MMC, eMMC, SD, or MicroSD) or a hard disk drive (HDD). The storage device 170 may contain a NAND flash memory with a mass storage capacity. Alternatively, the storage device 170 may be a next-generation nonvolatile memory (e.g., PRAM, MRAM, ReRAM, or FRAM) or a NOR flash memory.

A system interconnector 190 is a system bus for forming a network in the simulation system 100. The CPU 110, working memory 130, input/output device 150, and storage device 170 are electrically connected through the system interconnector 190 and exchange data through the system interconnector 190. However, the scope and spirit of the application may not be limited thereto. For example, arbitration devices may be further provided for efficient management.

According to the above description, the simulation system 100 calculates an increment of temperature of each element due to self-heating through the SPICE program 134 that refers to a received electric netlist of a circuit. The simulation system 100 applies the calculated increment to simulation of an electric circuit, thereby enabling high-speed circuit analysis considering self-heating.

Figure 4:
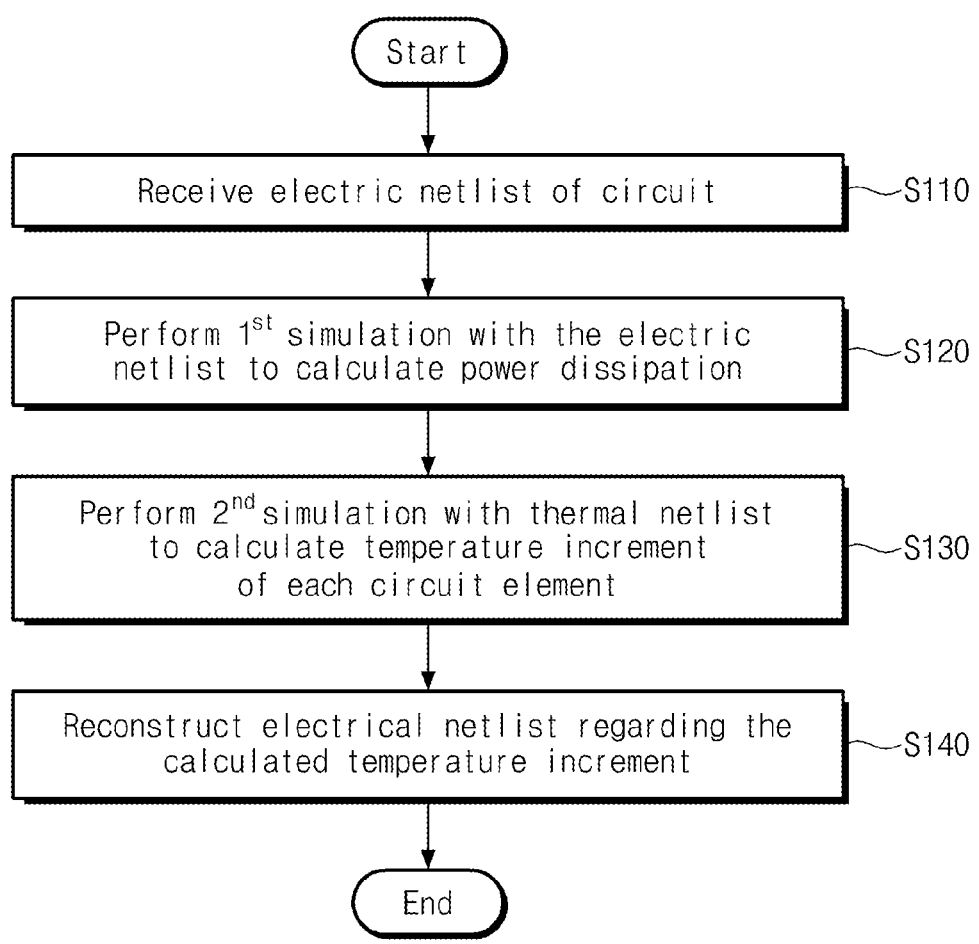
FIG. 4 is a flow chart schematically illustrating a circuit simulation method of a simulation system shown in FIG. 3, according to an embodiment of the application.

FIG. 4 is a flow chart schematically illustrating a circuit simulation method of a simulation system 100 shown in FIG. 3, according to an embodiment of the application. Referring to FIG. 4, a simulation system 100 according to an embodiment of the application calculates a temperature variation due to circuit or element self-heating at a particular point by use of a SPICE program.

In step S110, the simulation system 100 receives an electric netlist of a circuit. For example, the simulation system 100 may receive a netlist file created by a user. The user may create the electric netlist through an input/output device 150 or provide a previously created netlist file to the simulation system 100. At this time, the user may provide geometry information or material characteristic information of predetermined circuit elements. The characteristic information such as geometry information or heat conductivity of elements may be used to generate thermal netlist.

In step S120, the simulation system 100 performs a first simulation on the received electric netlist of the circuit. For example, a simulation control module 132 drives a SPICE program 134 for the first simulation. The simulation control module 132 has the SPICE program 134 simulate the received electric netlist of the circuit. As a result of the simulation, power dissipation of each circuit element defined in the electric netlist of the circuit may be defined.

A thermal circuit corresponding to each circuit element can be modeled when geometry information, material characteristic information, and power dissipation of each circuit element are provided. Components of the electric netlist of the circuit may be replaced with the thermal netlist of the circuit. One electric resistance may be replaced with a thermal resistance of a thermal circuit. It is appreciated that an electric resistance is replaced with a thermal resistance of a thermal circuit when a thermal capacitance is not greatly problematical. The thermal netlist of the circuit is completed when each element of an electric circuit is replaced with a parameter of the thermal circuit. Replacement with the thermal resistance or thermal capacitance may be made using geometry information and a material characteristic value of the above-described element of the electric netlist of the circuit. The thermal resistance and the thermal capacitance practically replace a value of an electric resistance in a SPICE program 134 (refer to FIG. 3). Likewise, current I of the electric circuit is replaced with power dissipation Q of the thermal circuit and a voltage V thereof with a temperature increment ΔT.

In step S130, the simulation system 100 performs second simulation for analyzing the thermal netlist of the circuit on each element. Temperature values of nodes for connecting elements and equivalent thermal resistances or thermal capacitances of the elements are provided according to the second simulation. A temperature of each element due to the self-heating is calculated.

In step S140, the electric netlist of the circuit is reconstructed considering the self-heating. That is, the electric netlist to which a temperature increment calculated through the second simulation is applied is updated. Simulation of the electric circuit considering the self-heating may be additionally performed by applying a particular function (adding a temperature variable) of the SPICE program 134 later.

A circuit analysis method according to an embodiment of the application is described. The thermal netlist according to an embodiment of the application that is created based on geometry information and material characteristic information is replaced with an element variable corresponding to the electric netlist of the circuit. If simulation by the SPICE program 134 is conducted, thermal circuit parameters are calculated according to a physical law of an electric circuit and converge on particular temperature values. However, a temperature increment may be output by an electric circuit analysis according to a correspondence relationship between an electric circuit and a thermal circuit, thereby making it possible to analyze an electric circuit considering effects due to the self-heating.

Figure 5:
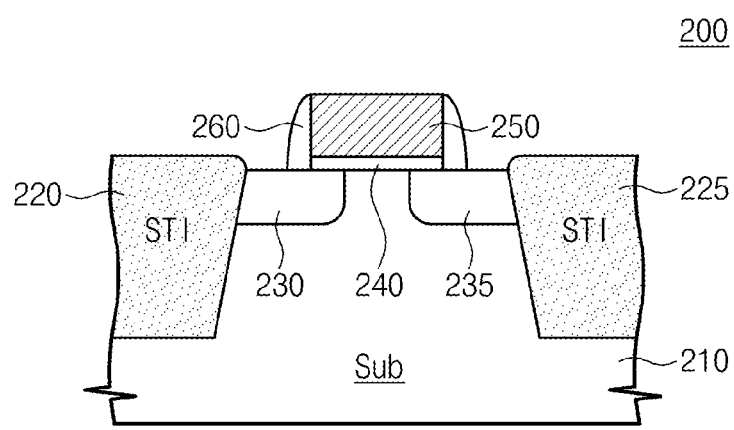
FIG. 5 is a cross-sectional view of a transistor for modeling a thermal circuit.

FIG. 5 is a cross-sectional view of a transistor for modeling a thermal circuit. Referring to FIG. 5, there is illustrated a cross section of a MOSFET transistor 200.

A bulk is formed on a substrate 210. Doping areas 230 and 235 are formed on the bulk to form a source and a drain. A gate insulation layer 240 and a gate electrode 250 are formed. The gate insulation layer 240 and the gate electrode 250 are protected by a spacer 260. Shallow trench isolations (STIs) 220 and 225 are formed for device isolation.

In the MOSFET transistor 200, heat due to self-heating is mostly emitted through the substrate 210 because a thermal resistance between the substrate 210 and the bulk is not great. By a simulation method according to an embodiment of the application, a dynamic temperature characteristic is estimated by a simple method even in this structure, and an estimated result is provided as reliability information for circuit simulation.

The MOSFET transistor 200 is only exemplary for the description of a thermal circuit modeling method, and the scope and spirit of the application may not be limited thereto. Modeling according to an embodiment of the application may be easily applied to the following power devices as well as the MOSFET transistor 200: bipolar junction transistor (BJT), junction FET transistor, insulated-gate bipolar transistor (IGBT), thyristor, gate turn-off thyristor (GTO), and Triac.

Figure 6:
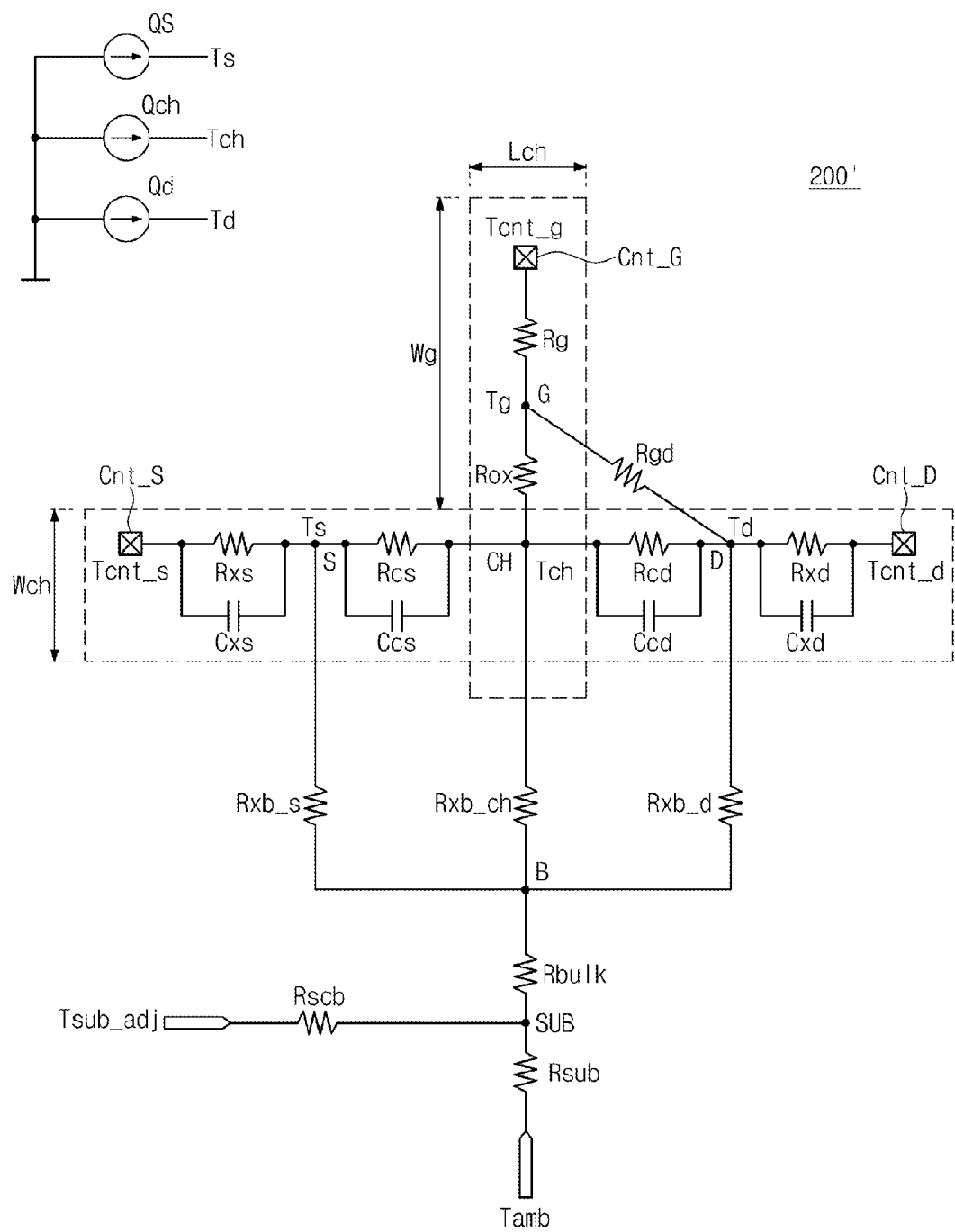
FIG. 6 is a circuit diagram showing an equivalent thermal circuit of a MOSFET transistor shown in FIG. 5.

FIG. 6 is a circuit diagram showing an equivalent thermal circuit of a MOSFET transistor 200 shown in FIG. 5. Referring to FIG. 6, a thermal circuit 200' of a MOSFET transistor 200 is simplified through a conversion manner described with reference to FIGS. 1A and 1B. A power consumed by the MOSFET transistor 200 is named "PWR". Power consumption PWR of a device is calculated through simulation of an electric circuit.

The thermal circuit 200' of the MOSFET transistor 200 will be described using thermal resistances or thermal capacitances on the basis of four nodes: source, drain, channel, and gate. Powers of values corresponding to power consumptions Qs, Qd, and Qch are provided to nodes (source, drain, and channel) where power consumption occurs. It is assumed that power is not practically consumed at the gate node G. The consumed powers Qs, Qd, and Qch may act as current sources of an electric circuit. The source power Qs consumed at the source node S is calculated by multiplying a factor, factor_s, of a source by the power consumption PWR. The powers Qd and Qch consumed at the drain and channel may be calculated in the same manner as described above. If power consumption acting as a power is modeled for every node, equivalent thermal resistances and thermal capacitances among the nodes are modeled.

A thermal resistance Rox corresponding to an insulation layer is inserted between the channel node CH and the gate node G. A gate thermal resistance Rg is disposed between the gate node G and a gate contact node Cnt_G. A target temperature Tg of the gate node G is output with a voltage value upon simulating the thermal circuit through SPICE program 134. A temperature Tcnt_g of the gate contact node Cnt_G is obtained in the same manner as described above.

A thermal resistance Rcs and a thermal capacitance Ccs are modeled as being inserted in parallel between the channel node CH and the source node S. The source power Qs acting as a current source is supplied to the source node S. A thermal resistance Rxs and a thermal capacitance Cxs are modeled as being connected in parallel between the source node S and a source contact node Cnt_S. A thermal resistance Rcd and a thermal capacitance Ccd are modeled as being connected in parallel between the channel node CH and the drain node D. The drain power Qd acting as a current source is supplied to the drain node D. A thermal resistance Rxd and a thermal capacitance Cxd are modeled as being connected in parallel between the drain node D and a drain contact node Cnt_D.

A thermal resistance Rgd is modeled as being connected between the gate node G and the drain node D. The reason is that power consumed at the drain node D is relatively great compared with other nodes and a heating value is relatively great. Thus, the thermal resistance Rgd is inserted to model heat emission into the gate node G through a spacer 260. In addition, heat emission into a substrate through a bulk is more exactly described by adding a bulk node B and a substrate node SUB. In this case, a thermal resistance Rxb_s is inserted between the bulk node B and the source node S, a thermal resistance Rxb_ch between the bulk node B and the channel node CH, and a thermal resistance Rxb_d between the drain node D and the bulk node B. A thermal resistance Rbulk is modeled as being between the bulk node B and the substrate node SUB. A thermal resistance Rsub is modeled as being between a surface of the substrate and the substrate node SUB, and a thermal resistance Rscb is modeled as being between a substrate of an adjacent element and the substrate node SUB. Tamb is the ambient temperature.

In exemplary embodiments, temperature values Tch, Ts, Td, Tcnt_s, Tcnt_d, Tcnt_g, and Tsub_adj about the nodes may be obtained through simulation for heat analysis according to an embodiment of the application. The thermal circuit model 200' of the MOSFET transistor 200 may further include geometry information. That is, the thermal circuit model 200' may further include information about a channel width and channel length of the MOSFET transistor 200. For example, a thermal resistance may be calculated from an aspect ratio Lch/Wch of a channel and using a thermal conductivity of the channel. A thermal capacitance may be calculated using a time constant or geometry information and material characteristic information.

Modeling about a thermal circuit 200' corresponding to a MOSFET transistor 200 is schematically described. If the modeled thermal circuit 200' is simulated in a manner for analyzing an electric circuit, a temperature of each node may be deduced with a value corresponding to a voltage, thereby making it possible to estimate a temperature variation due to self-heating about an operation of the MOSFET transistor 200 exactly. In addition, the self-heating effect about a particular portion may be estimated with respect to various application circuits by use of the MOSFET transistor 200.

Figure 7:
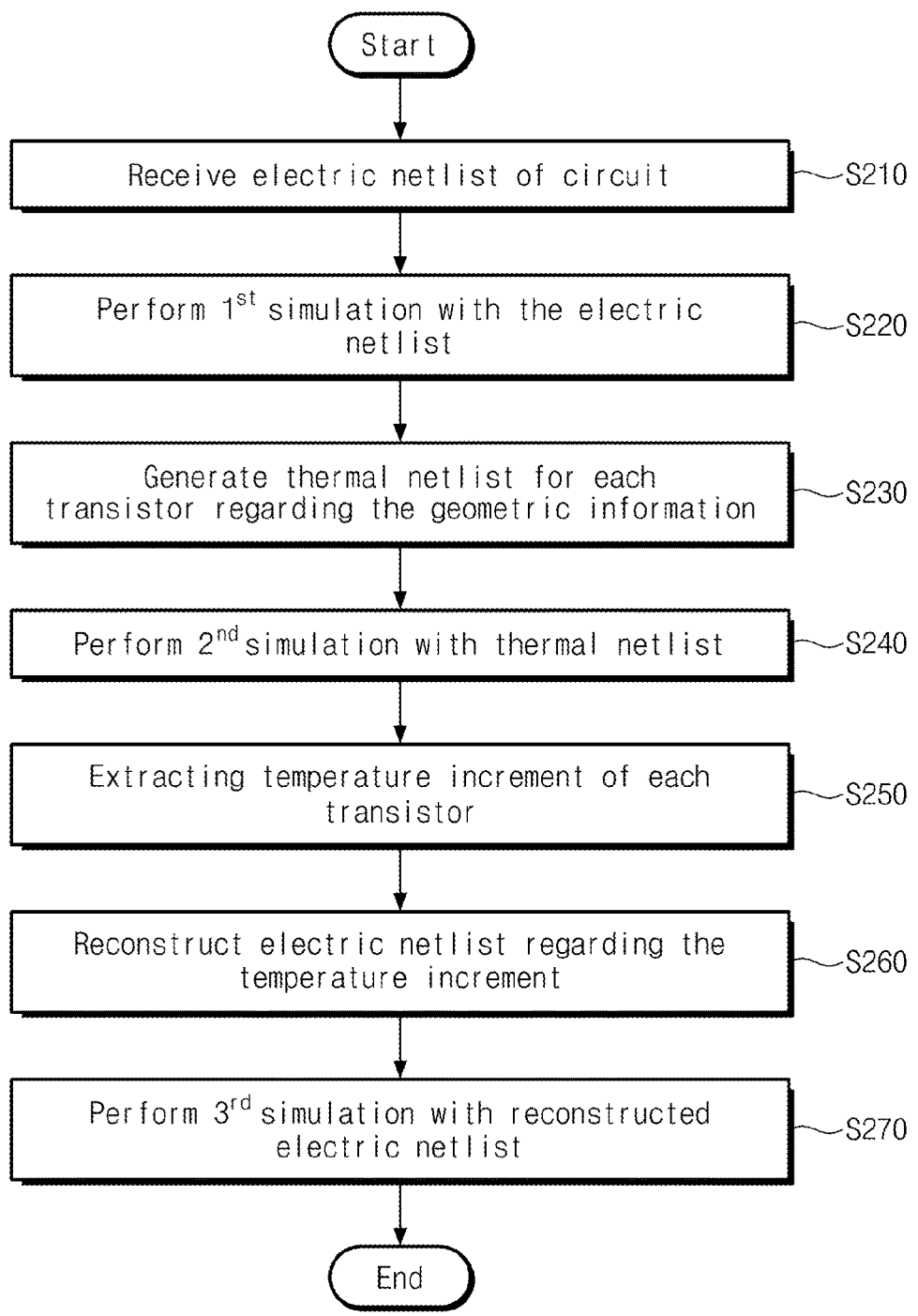
FIG. 7 is a flow chart schematically illustrating a circuit simulation method of a simulation system shown in FIG. 3, according to another embodiment of the application.

FIG. 7 is a flow chart schematically illustrating a circuit simulation method of a simulation system 100 shown in FIG. 3, according to another embodiment of the application. Referring to FIG. 7, a simulation system 100 according to an embodiment of the application calculates a self-heating characteristic of a designed circuit by use of a circuit simulation program such as SPICE.

In step S210, the simulation system 100 receives an electric netlist of the circuit to be designed. For example, the simulation system 100 may receive a netlist file created by a user. The user may create the electric netlist through an input/output device 150 or provide a previously created netlist file to the simulation system 100. At this time, the user may provide geometry information or material characteristic information of predetermined circuit elements.

In step S220, the simulation system 100 performs a first simulation of the received electric netlist of the circuit. For example, a simulation control module 132 (refer to FIG. 3) has a SPICE program 134 analyze an electric circuit using the netlist for the first simulation, and the SPICE program 134 simulates the electric circuit of the provided netlist. As a result of the simulation, power dissipation of each circuit element defined in the electric netlist of the circuit may be defined.

In step S230, the simulation system 100 generates a thermal netlist, based on the first simulation result and the geometry and material characteristic information of elements thus received. The simulation system 100 calculates thermal resistances or thermal capacitances of nodes modeled using information such as channel length, channel width, and thermal conductivity of each element of a circuit. In addition, the simulation system 100 calculates powers consumed at a channel, a source, and a drain using power consumption of each element. At this time, powers consumed at the source, drain, and channel of the element may be calculated using power consumption PWR created through the first simulation as factors (or ratios) factor_s, factor_ch, and factor_d about the source, drain, and channel.

If thermal resistances, thermal capacitances, and power consumption about a thermal circuit of each element are determined, a thermal netlist for thermal analysis is constructed. The simulation control module 132 generates the thermal netlist through replacement with a thermal circuit model about each transistor defined in the electric netlist. A power consumption value of each node of each element is substituted with a value corresponding to a current source. The thermal resistance replaces an electric resistance value for analysis of the SPICE program 134. In addition, the thermal netlist is constructed such that the thermal capacitance acts as an electric capacitance. Components of a transistor defined by the thermal netlist do not exactly correspond to those of a transistor defined by the electric netlist. However, the thermal netlist may be analyzed through a simulation for analyzing an electric circuit by the SPICE program 134.

In S240, a second simulation about the generated thermal netlist is performed. During the second simulation, the thermal circuit is analyzed based on an operating law of an electric circuit. This is based on a similarity to the ohm's law in an electric circuit and the Fourier law. Defined is a temperature of each transistor defined by the thermal netlist upon performing the second simulation for analyzing the thermal circuit. In addition, a temperature is defined for every node of each transistor. A temperature value of each node is output with a voltage value as a simulation result.

In step S250, there are extracted temperature values of transistors or nodes of the transistors determined through the second simulation. Temperatures of nodes defined through modeling about a channel, a drain, and a source of a transistor and about a contact, bulk, and a substrate are output as a result of the second simulation. Calculated are temperature increments of transistors due to self-heating by use of the values.

In step S260, the simulation system 100 creates an electric netlist considering the temperature increments of transistors due to the self-heating. That is, the first simulation is made under the condition that a self-heating based temperature value of an element is never considered. However, characteristics of transistors and circuits are actually varied due to a temperature that rises due to the self-heating. Here, during SPICE simulation, for example, a "dtemp" function is used to apply a temperature increase to the electric netlist.

In S270, there is performed a third simulation using an electric netlist that is updated considering a temperature increase due to the self-heating. The third simulation makes it possible to optimize the performance and reliability of a circuit considering the self-heating of a designed circuit.

Described is a self-heating based circuit simulation method according to an embodiment of the application. A thermal circuit is simulated based on an analysis law of an electric circuit. According to this analysis method, it is possible to apply to a thermal circuit a time constant which reduces a rising or falling speed of temperature compared with a power practically to be consumed. Thus, it is possible to analyze self-heating at a particular point dynamically as well as to analyze a thermal circuit of a steady state.

Figure 8:
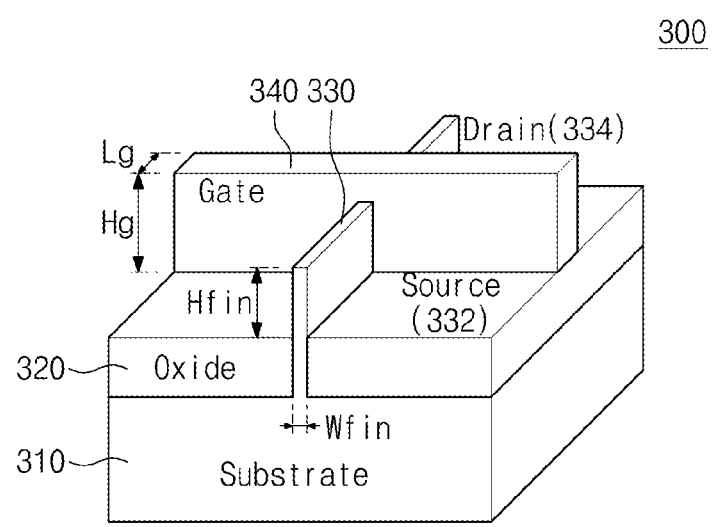
FIG. 8 is a perspective view of a FinFET transistor showing an example of circuit modeling for analyzing a thermal circuit according to an embodiment of the application.

FIG. 8 is a perspective view of a FinFET transistor for showing an example of circuit modeling analysis of a thermal circuit according to an embodiment of the application. Referring to FIG. 8, a bulk-type FinFET transistor 300 is illustrated to describe features of the embodiment.

A silicon pin 330 and an oxide film area 320 are formed on a substrate 310. A gate 340 is formed on the oxide film area 320 and the silicon pin 330. The silicon pin 330 may form a source 332 and a drain 334. In general, the silicon pin 330 is iteratively arranged on the substrate 310 in compliance with a predetermined rule and is separated from an adjacent silicon pin through device isolation (e.g., trench (STI)) (not shown).

A gate 340 crosses the silicon pin 330. The silicon pin 330 placed at one side of the gate 340 acts as the source 332, and the silicon pin 330 placed at the other side of the gate 340 acts as the drain 334. The silicon pin 330 is formed by etching a portion of the substrate 310 and has a protruded structure. Thus, both side walls and upper surfaces are defined. Although not shown in figure, the etched portion of the substrate 310 is filled by the device isolation as the trench.

Here, the FinFET transistor 300 may be expressed using geometry information to model a thermal circuit. That is, the FinFET transistor 330 may be expressed using geometry information such as a height Hfin and a width Wfin of the silicon pin 330 and a height Hg and a width Lg of the gate 340. Although not shown in the figure, also, a distance Lsd between contacts for connection with the source 332 and the drain 334 and an exposed length Lext of the silicon pin 330 are used as the geometry information.

The above-described FinFET transistor 300 has a structure difficult to emit the Joule heat of the source, drain, and channel formed at the silicon pin 330. For this reason, the self-heating needs to be considered to conduct circuit analysis of high reliability in such a structure as the FinFET transistor 300.

Figure 9:
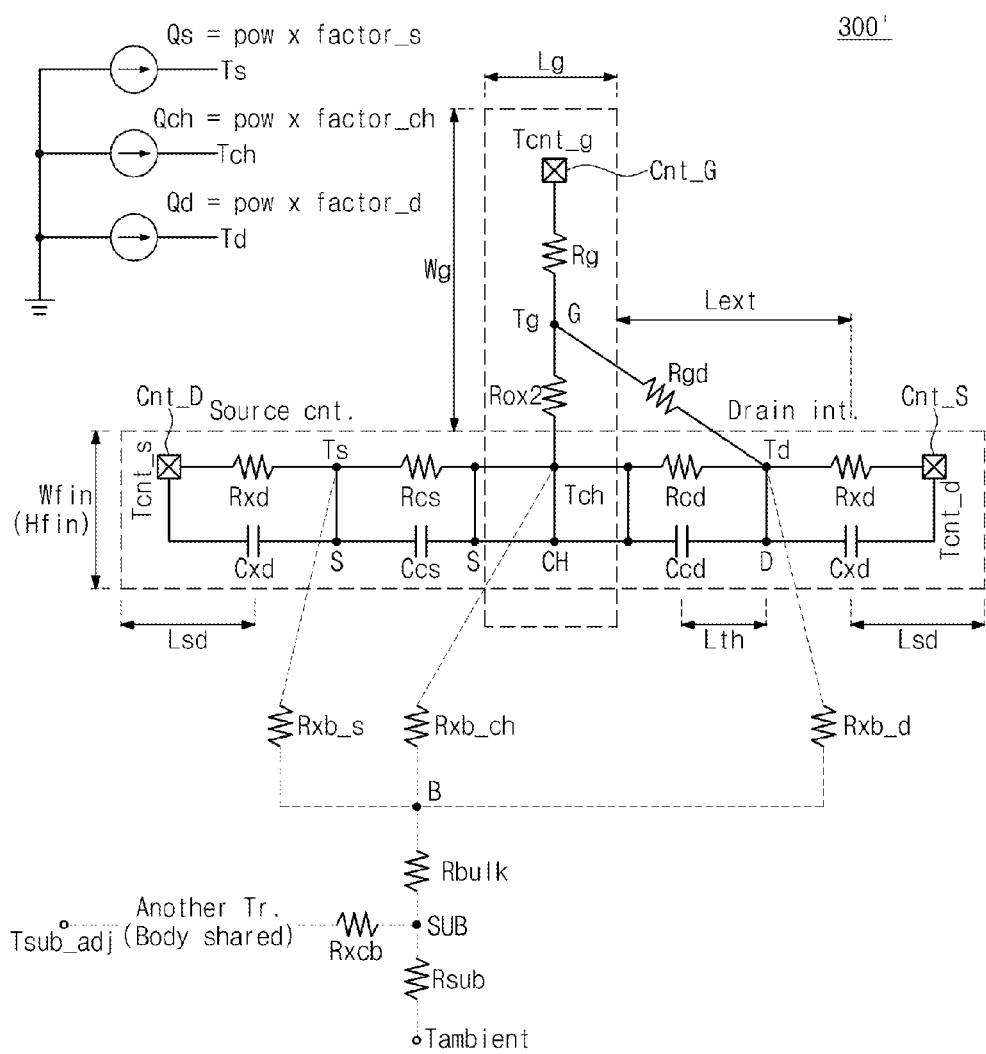
FIG. 9 is a circuit diagram showing an equivalent thermal circuit of a FinFET transistor of FIG. 8 modeled in the form of an electric circuit.

FIG. 9 is a circuit diagram showing an equivalent thermal circuit of a FinFET transistor 300 of FIG. 8 modeled in the form of an electric circuit. Referring to FIG. 9, a thermal circuit of a FinFET transistor 300 is illustrated to be similar to that of a MOSFET transistor 200 described with reference to FIG. 6. Here, power consumption PWR of an element may be calculated through electric-circuit simulation.

The thermal circuit 300' of the FinFET transistor 300 will be modeled by connecting thermal resistances and thermal capacitances on the basis of four nodes: source, drain, channel, and gate. Here, consumed powers Qs, Qd, and Qch acting as consumed powers are separately illustrated for the sake of easy illustration.

It is assumed that a power is not consumed at a gate node G. The consumed powers Qs, Qd, and Qch act as current sources of an electric circuit. The source power Qs consumed at a source node is calculated by multiplying a factor, factor_s, of a source to the power consumption PWR. The powers Qd and Qch consumed at the drain and channel may be calculated in the same manner as described above. If power consumption acting as a power is modeled at every node, equivalent thermal resistances and thermal capacitances among the nodes are modeled.

A thermal resistance Rox2 corresponding to an insulation layer is inserted between a channel node CH and the gate node G. A gate thermal resistance Rg is disposed between the gate node G and a gate contact node Cnt_G. A target temperature Tg of the gate node G is output with a voltage value upon simulating the thermal circuit. A temperature Tcnt_g of the gate contact node Cnt_G is obtained in the same manner as described above.

A thermal resistance Rcs and a thermal capacitance Ccs are modeled as being inserted in parallel between the channel node CH and the source node S. The source power Qs acting as a current source is supplied to the source node S. A thermal resistance Rxs and a thermal capacitance Cxs are modeled as being connected in parallel between the source node S and a source contact node Cnt_S. A thermal resistance Rcd and a thermal capacitance Ccd are modeled as being connected in parallel between the channel node CH and the drain node D. The drain power Qd acting as a current source is supplied to the drain node D. A thermal resistance Rxd and a thermal capacitance Cxd are modeled as being connected in parallel between the drain node D and a drain contact node Cnt_D.

A thermal resistance Rgd is modeled as being connected between the gate node G and the drain node D. The reason is that power consumed at the drain node D is relatively great compared with other nodes and a heating value is relatively great. Thus, the thermal resistance Rgd is inserted to model heat emission into the gate node G through a spacer 260. In addition, heat emission into a substrate through a bulk is more exactly described by adding a bulk node B and a substrate node SUB. In this case, a thermal resistance Rxb_s is inserted between the bulk node B and the source node S, a thermal resistance Rxb_ch between the bulk node B and the channel node CH, and a thermal resistance Rxb_d between the drain node D and the bulk node B. A thermal resistance Rbulk is modeled as being between the bulk node B and the substrate node SUB. A thermal resistance Rsub is modeled as being between a surface of the substrate and the substrate node SUB, and a thermal resistance Rxcb is modeled as being between a substrate of an adjacent element and the substrate node SUB.

In exemplary embodiments, temperature values Tch, Ts, Td, Tcnt_s, Tcnt_d, Tcnt_g, and Tsub_adj about the nodes may be obtained through simulation for heat analysis according to an embodiment of the application. The thermal circuit model 300' of the FinFET transistor 300 may further include a variety of geometry information. A thermal resistance may be calculated using thermal conductivity and geometry information of each material. Such distinct values may be provided by a maker of the device. A thermal capacitance may be calculated in the same manner as the thermal resistance.

Modeling of thermal circuit 300', corresponding to a FinFET transistor 300, is schematically described. If the modeled thermal circuit 300' is simulated in a manner for analyzing an electric circuit, a temperature of each node may be deduced with a value corresponding to a voltage, thereby making it possible to estimate a temperature variation due to self-heating in the operation of the FinFET transistor 300 exactly.

Figure 10:
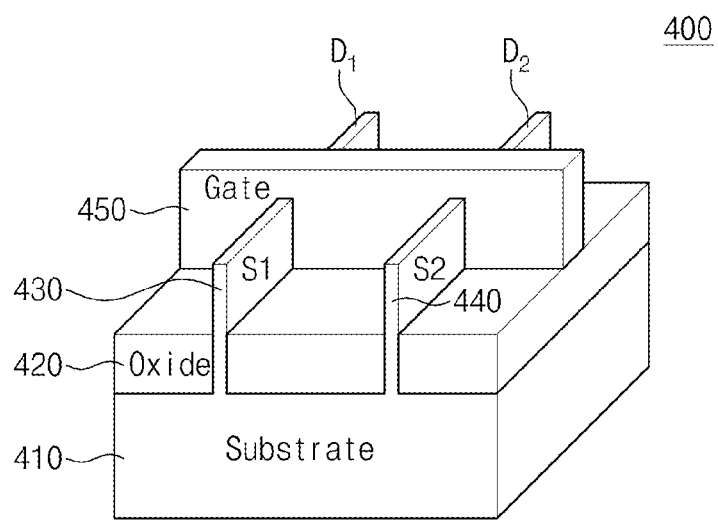
FIG. 10 is a perspective view of a FinFET transistor having a shape different from a FinFET transistor shown in FIG. 8.

FIG. 10 is a perspective view of a FinFET transistor having a shape different from a FinFET transistor shown in FIG. 8. Referring to FIG. 10, a FinFET 400 includes two silicon pins 430 and 440. This structure is named "multi-fin structure".

Silicon pins 430 and 440 and an oxide film area 420 are formed on a substrate 410. A gate 450 is formed on the oxide film area 420 and the silicon pins 430 and 440. The silicon pin 430 acts as a source S1 and a drain D1, and the silicon pin 440 acts as a source S2 and a drain D2. In the FinFET transistor 400 of the multi-fin structure, self-heating may occur at the silicon pins 430 and 440, respectively. Thus, the silicon pins 430 and 440 need to be modeled in thermal circuits, and the thermal circuits need to be modeled considering interaction between the silicon pins 430 and 440. An embodiment of the application is exemplified as the FinFET 400 has two pins. However, the scope and spirit of the application may not be limited thereto. For example, a thermal circuit model method according to an embodiment of the application is applicable to a FinFET transistor having three or more silicon pins.

Figure 11:
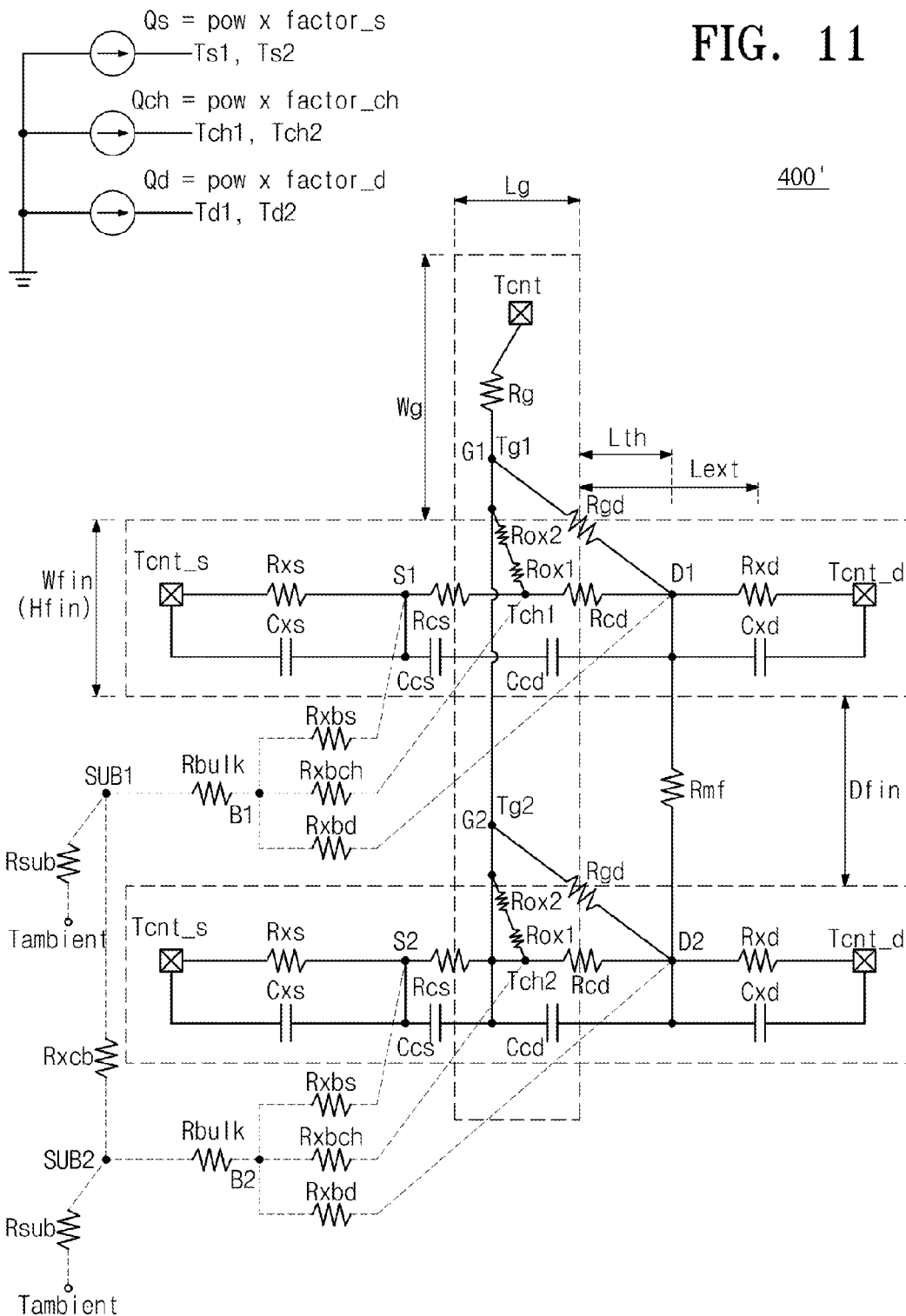
FIG. 11 is a circuit diagram showing an equivalent thermal circuit of a FinFET transistor having a multi-fin structure shown in FIG. 10.

FIG. 11 is a circuit diagram showing an equivalent thermal circuit of a FinFET transistor 400 having a multi-fin structure shown in FIG. 10. Referring to FIG. 11, a thermal circuit about a FinFET transistor 400' is illustrated to be similar to that of a MOSFET transistor 300' described with reference to FIG. 9. Here, power consumption PWR of an element may be calculated through electric-circuit simulation.

The thermal circuit 400' of the FinFET transistor 400 has two silicon pins. Thus, the thermal circuit 400' of the FinFET transistor 400 will be modeled using thermal resistances Rxs, Rcs, Rcd, and Rxd and thermal capacitances Cxs, Ccs, Ccd, Cxd about four nodes (source, drain, channel, and gate) of each silicon pin.

Thermal resistances Rox1 and Rox2 corresponding to an insulation layer are inserted between a first channel node CH1 and a first gate node G1. A gate thermal resistance Rg is disposed between the first gate node G1 and a gate contact node Cnt_G. A thermal resistance Rcs and a thermal capacitance Ccs are modeled as being inserted in parallel between the first channel node CH1 and a first source node S1. A source power Qs acting as a current source is supplied to the first source node S1.

A thermal resistance Rxs and a thermal capacitance Cxs are modeled as being connected in parallel between the first source node S1 and a source contact node Cnt_S. A thermal resistance Rcd and a thermal capacitance Ccd are modeled as being connected in parallel between the first channel node CH1 and the first drain node D1. A drain power Qd acting as a current source is supplied to the first drain node D1. A thermal resistance Rxd and a thermal capacitance Cxd are modeled as being connected in parallel between the first drain node D1 and a drain contact node Cnt_D.

Modeling of thermal resistances and capacitances may be identically applied to another silicon pin, and a description thereof is thus omitted. In addition, thermal resistances Rgd are modeled as being connected between the first gate node G1 and the first drain node D1 and between a second gate node G2 and a second drain node D2.

In addition, heat emission into a substrate through a bulk is more exactly described by adding a first bulk node B1 and a first substrate node SUB1. In this case, a thermal resistance Rxbs is inserted between the bulk node B1 and the source node S1, a thermal resistance Rxbch between the bulk node B1 and a channel node CH1, and a thermal resistance Rxbd between the drain node D1 and the bulk node B1. A thermal resistance Rbulk is modeled as being between the bulk node B1 and the substrate node SUB1. This modeling of the thermal circuit may be identically applied to the other silicon pin. An embodiment of the application is exemplified as a thermal resistance Rxcb exists between the substrate nodes SUB1 and SUB2. In exemplary embodiments, temperature values of channel nodes Tch1 and Tch2, source nodes Ts1 and Ts2, drain nodes Td1 and Td2, bulk nodes, contact nodes Tcnt for the gate, source and drain, and substrate nodes Tsub_adj may be obtained through simulating heat analysis according to an embodiment of the application.

Here, it is assumed that the first gate node G1 and the second gate node G2 are thermally separated. An embodiment of the application is exemplified as a gate thermal resistance Rg (not shown) exists between the first gate node G1 and the second gate node G2. A thermal resistance Rmf for describing contact sharing among pins may be depicted as being between the drain nodes D1 and D2. A thermal resistance of the substrate is depicted through the thermal resistance Rsub because the substrate is shared by the two pins.

Modeling about a thermal circuit 400' corresponding to a FinFET transistor 400 having a multi-pin structure is schematically described. If the modeled thermal circuit 400' is simulated in a manner for analyzing an electric circuit, a temperature of each node may be deduced with a value corresponding to a voltage, thereby making it possible to estimate a temperature variation due to self-heating in the operation of the FinFET transistor 400 exactly.

Figure 12:
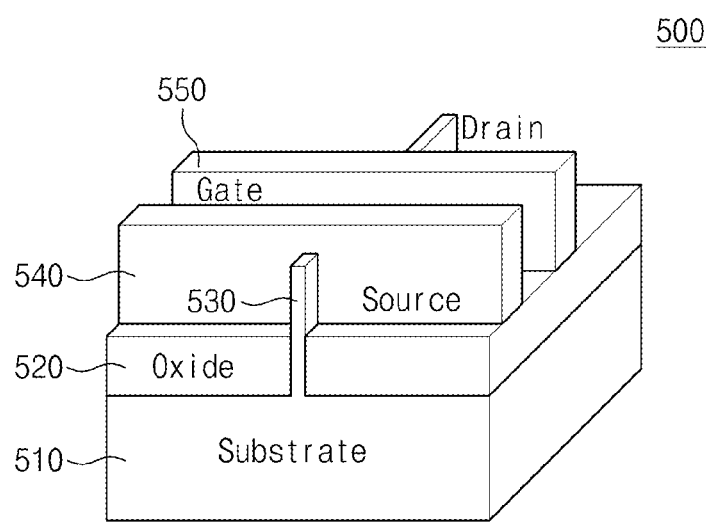
FIG. 12 is a perspective view of a FinFET transistor having a multi-finger structure.

FIG. 12 is a perspective view of a FinFET transistor 500 having a multi-finger structure. Referring to FIG. 12, a FinFET transistor 500 of a multi-finger structure contains two gates 540 and 550. Silicon pin 530 and an oxide film area 520 are formed on a substrate 510. Silicon pin 530 serves as both the drain and source of FinFET transistor 500.

The FinFET transistor 500 employing the multi-finger structure has a structure where two gate lines 540 and 550 crosses one silicon pin 530 in an orthogonal direction. For this reason, thermal circuits about channels at intersections of the gates 540 and 550 and the silicon pin 530 need to be modeled. In addition, the thermal circuits need to be modeled considering heat emission into a bulk substrate and two channels formed by the two gates 540 and 550. An embodiment of the application is exemplified as the FinFET transistor 500 has two gates. However, the scope and spirit of the application may not be limited thereto. For example, a thermal circuit modeling method according to an embodiment of the application is applicable to a FinFET transistor having three or more gates.

Figure 13:
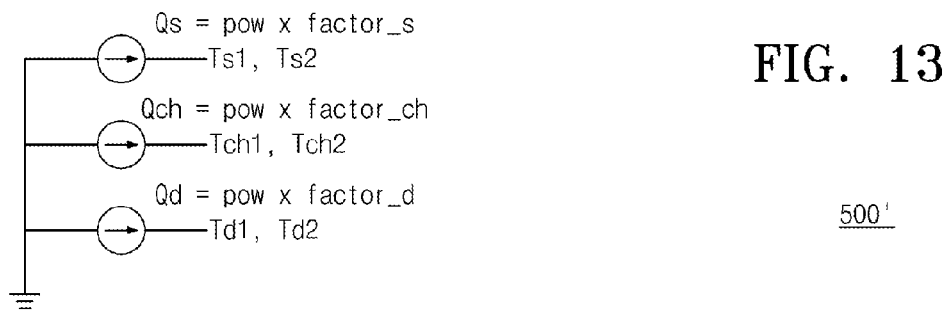
FIG. 13 is a circuit diagram showing an equivalent thermal circuit of a multi-finger structured FinFET transistor shown in FIG. 12.
Figure 13:
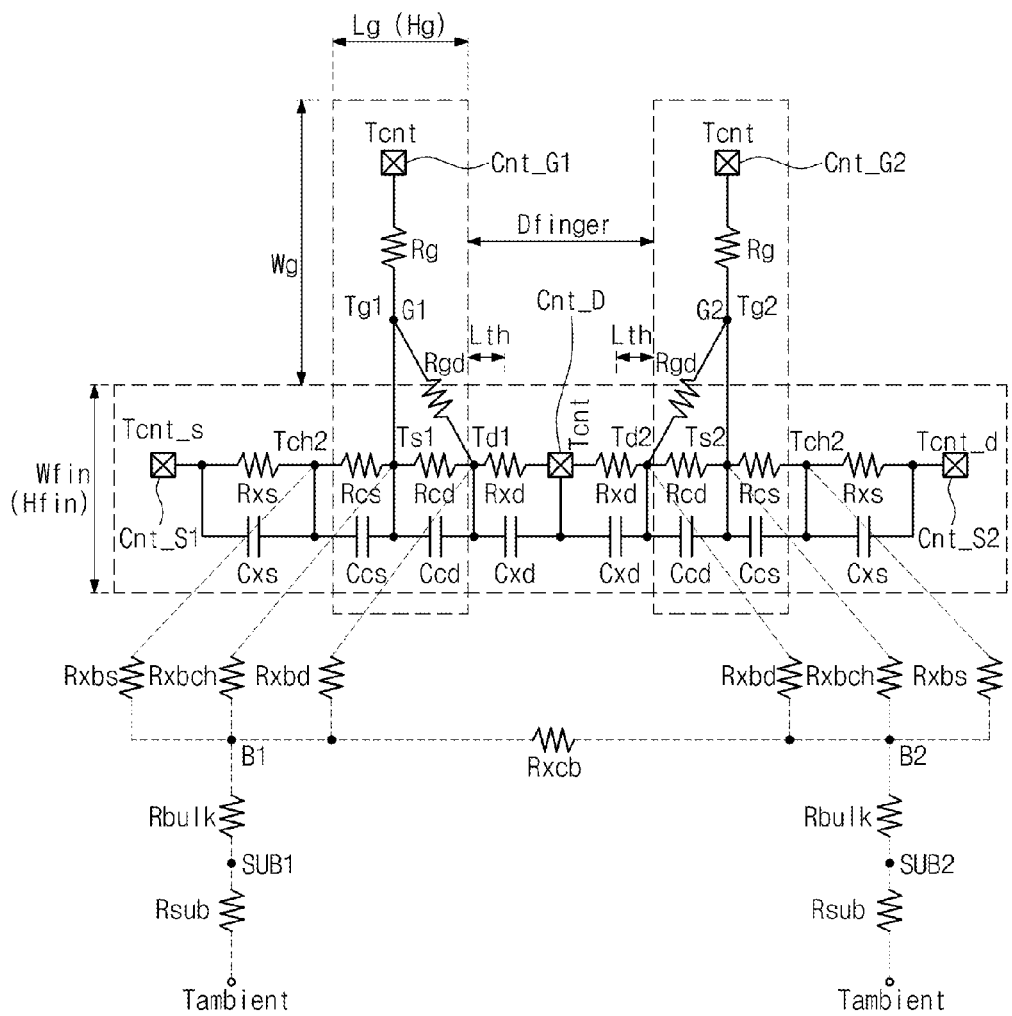

FIG. 13 is a circuit diagram showing an equivalent thermal circuit of a multi-finger structured FinFET transistor shown in FIG. 12. Referring to FIG. 13, in a FinFET transistor 500' having a multi-finger structure, parameters are additionally adjusted as gates are added to a thermal circuit of a basic FinFET transistor 300' described with reference to FIG. 9. A thermal netlist may be created based on the parameters. A simulation control module 132 (refer to FIG. 3) according to an embodiment of the application may create the thermal netlist of a FinFET transistor depending on the number of gates or pins and a pin or gate structure.

Power PWR that the FinFET transistor 500 of the multi-finger structure consumes is calculated by simulating an electric circuit. Thermal sources Qs, Qch, and Qd to be provided to nodes are modeled by use of the calculated power. The thermal sources Qs, Qch, and Qd may be generated at a netlist of SPICE simulation in the form of current source. The thermal sources Qs, Qch, and Qd are calculated by multiplying factors, factor_s, factor_d, and factor_ch, to the power consumption PWR.

A thermal circuit 500' of the FinFET transistor 500 having the multi-finger structure is modeled in two gate nodes G1 and G2, two channel nodes CH1 and CH2, a common drain node D, and two source nodes S1 and S2 according to two gates. A netlist is created such that a thermal resistance Rxs and a thermal capacitance Cxs are connected in parallel between a source node S1 and a contact node Cnt_S1. The netlist is created such that a thermal resistance Rcs and a thermal capacitance Ccs are connected in parallel between the source node S1 and a channel node CH1. The netlist is created such that a thermal resistance Rcd and a thermal capacitance Ccd are connected in parallel between the channel node CH1 and the drain node D1 and such that a thermal resistance Rxd and a thermal capacitance Cxd are connected in parallel between the drain node D1 and a contact node Cnt_D.

In addition, a thermal resistance Rg is connected between a contact node Cnt_G1 and the gate node G1, and thermal resistances Rox1 and Rox2 (not shown) are connected in series between the gate node G1 and the channel node CH1. A thermal resistance Rgd is modeled as being connected between the gate node G1 and the drain node D1. Likewise, a thermal resistance Rxbs is modeled as being connected between the bulk node B1 and the source node S1, a thermal resistance Rxbch is modeled as being connected between the bulk node B1 and the channel node CH1, and a thermal resistance Rxbd is modeled as being connected between the bulk node B1 and the drain node D1. A thermal resistance Rbulk is modeled as being connected between the bulk node B1 and the substrate node SUB1, and a thermal resistance Rsub is modeled as being connected between the substrate node SUB1 and the exterior.

This thermal circuit structure is symmetrical with the contact node Cng_D at a drain side as the center, and a description for the thermal circuit configuration pf the symmetrical structure is omitted. However, because two gates share a bulk, a thermal resistance Rxcb is depicted as being between the bulk nodes B1 and B2, to describe bulk sharing between gates.

Modeling of a thermal circuit 500' corresponding to a FinFET transistor 500 is schematically described. If the modeled thermal circuit 500' is simulated in a manner for analyzing an electric circuit, a temperature of each node may be deduced with a value corresponding to a voltage, thereby making it possible to estimate a temperature variation due to self-heating in the operation of the FinFET transistor 500 exactly.

Here, FinFET transistors according to embodiments of the application are modeled to create a thermal netlist according to an embodiment of the application. However, the scope and spirit of the application may not be limited thereto. For example, modeling a thermal circuit using thermal resistances and capacitances may be applied to various circuit elements as well as a FinFET transistor.

Figure 14:
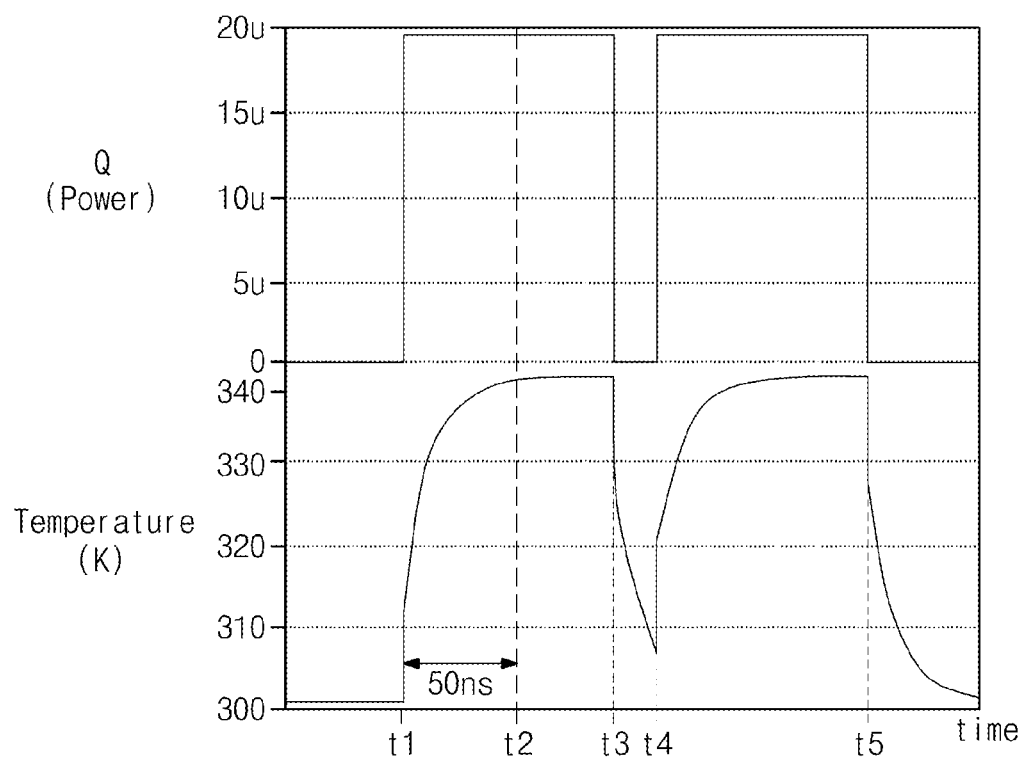
FIG. 14 is a waveform diagram schematically illustrating a result of a simulation executed to analyze a thermal circuit according to an embodiment of the application.

FIG. 14 is a waveform diagram schematically illustrating a result of a simulation executed to analyze a thermal circuit according to an embodiment of the application. Referring to FIG. 14, a temperature at a particular point of an element rises slower than power consumption Q. A thermal capacitance is added to a thermal circuit according to an embodiment of the application to describe a dynamic temperature characteristic.

A power Q consumed at the particular node of the element is applied in the form of square wave at t1. However, due to a thermal time constant τ (=Rth×Cth), a temperature T rises slower than the power consumption Q. For example, a time of about 50 ns is taken until the temperature T reaches a steady state.

If the power consumption Q decreases to "0" at t3 and then rises at t4, the temperature T practically decreases smoothly. Nevertheless, the temperature does not reach the lowest point, but it again rises. That is, a variation in a temperature is slower than that in the power consumption Q.

A dynamic variation value of a temperature about a particular point is obtained through SPICE simulation using the thermal netlist according to an embodiment of the application. This characteristic may be provided as more exact information for reliability of an electric circuit.

Figure 15:
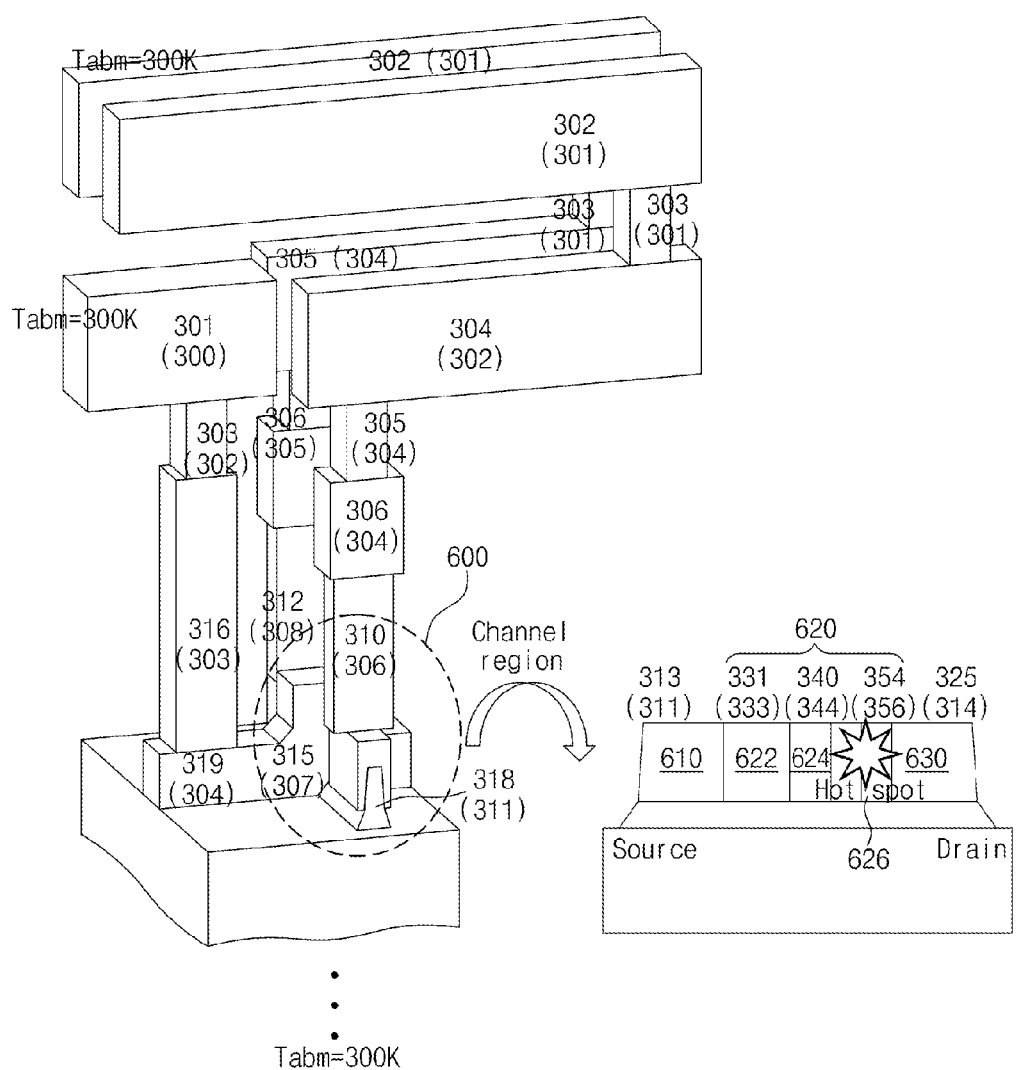
FIG. 15 is a perspective view schematically illustrating a result of performing a simulation using a thermal netlist according to an embodiment of the application.

FIG. 15 is a perspective view schematically illustrating a result of performing simulation using thermal netlist according to an embodiment of the application. Referring to FIG. 15, a temperature that is extracted using a circuit simulation tool of a source 610, a channel 620, and a drain 630 of a FinFET transistor 600 may be coterminous to that obtained using a dedicated tool. Here, numbers denoted at points are values obtained using a dedicated tool for simulating a temperature of a device, and values shown in brackets are values obtained using circuit simulation according to an embodiment of the application.

Assuming that an ambient temperature is about 300 K, a temperature of the source 610 of the FinFET transistor 600 is estimated to be about 311 K as a result of the circuit simulation according to an embodiment of the application. This temperature is similar to 313 K estimated using the dedicated tool. However, a value estimated as a result of the circuit simulation according to an embodiment of the application performed with respect to the drain 630 is about 314 K, and a value estimated by the dedicated tool is about 325 K. Temperatures of the source 610 and the drain 630 are not problematic in self-heating. The self-heating is problematic at the channel 620 of which the carrier density is high. Temperatures at points of the channel 620 estimated through the circuit simulation according to an embodiment of the application are about 333 K (622), 344 K (624), and 356 K (626). Temperatures at points of the channel 620 estimated through the dedicated tool are about 331 K, 340 K, and 354 K. This means that values estimated through the circuit simulation utilizing the thermal netlist according to an embodiment of the application are almost similar to those estimated using the dedicated tool.

Figure 16:
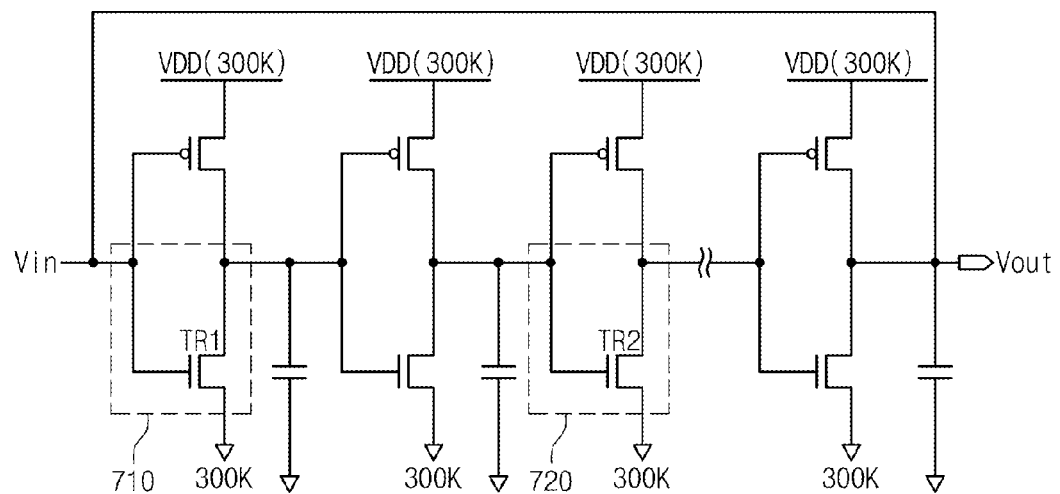
FIG. 16 is a circuit diagram schematically illustrating a ring oscillator designed by use of circuit simulation according to an embodiment of the application.

FIG. 16 is a circuit diagram schematically illustrating a ring oscillator designed by use of circuit simulation according to an embodiment of the application. Referring to FIG. 16, a ring oscillator 700 includes a plurality of inverters that are sequentially connected. Here, MOSFET transistors of the inverters may be modeled in a thermal circuit according to the above-described manner. Detected is a temperature variation of each element by use of the thermal-circuit simulation.

In the ring oscillator 700, since a semiconductor pattern corresponding to an inverter is iterated, power consumption of a transistor 710 at an input state is identical to that of a transistor 720 placed at the center of an inverter chain. However, a temperature of the transistor 710 is different from that of the transistor 720 due to a difference between ambient temperatures. An ambient temperature of the transistor 710 is low, while an ambient temperature of the transistor becomes relatively higher due to a temperature increase of adjacent transistors. It is difficult to consider this temperature characteristic before a layout, but the temperature characteristic is detected by simulation performed after the layout.

Figure 17:
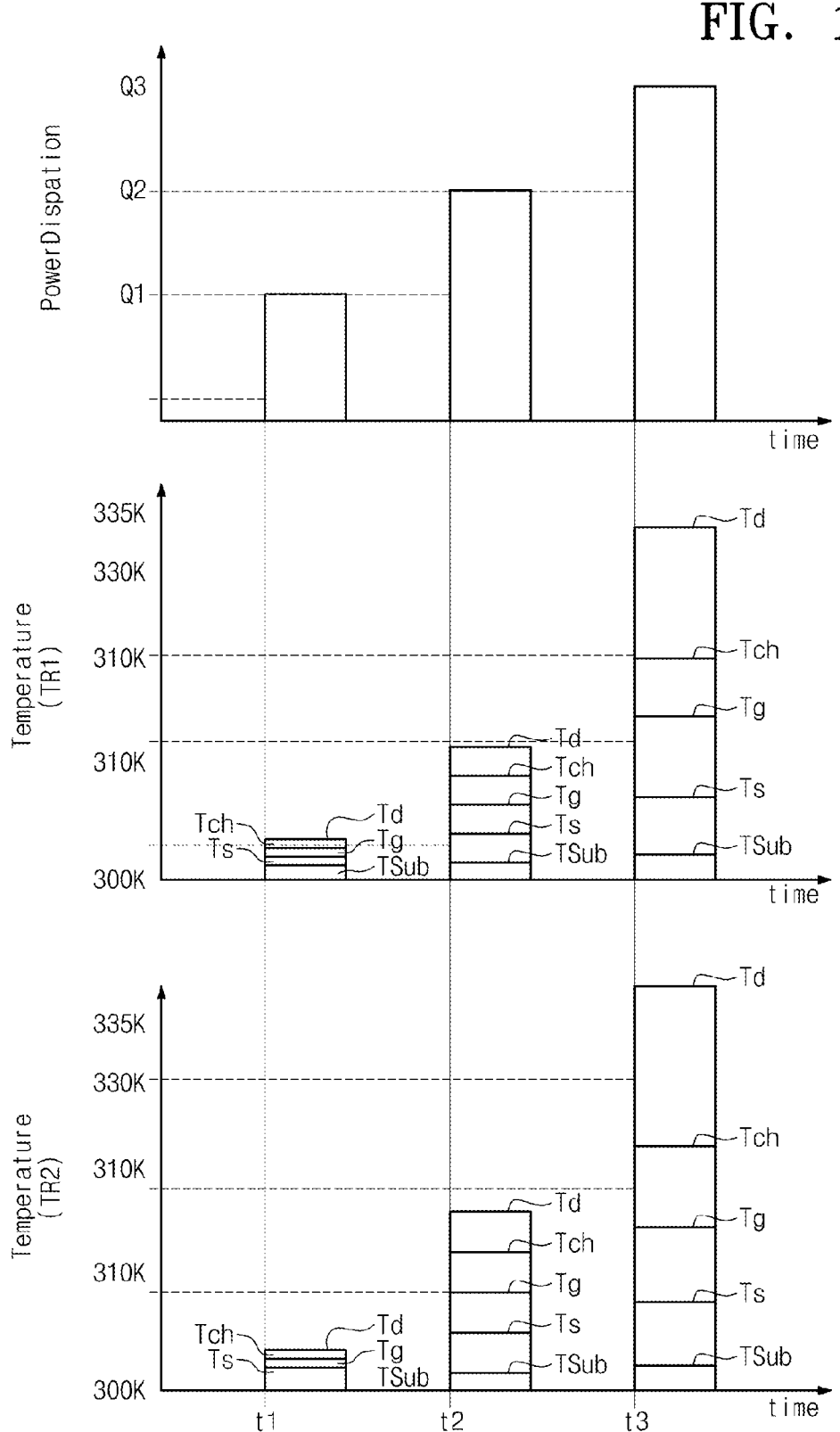
FIG. 17 is a diagram schematically illustrating temperature variations of transistors shown in FIG. 16.

FIG. 17 is a diagram schematically illustrating temperature variations of transistors shown in FIG. 16. Referring to FIG. 17, even though powers consumed by transistors TR1 and TR2 are identically maintained, temperature increments of the transistors TR1 and TR2 are practically different from each other.

It is assumed that three different power levels are applied to the transistors TR1 and TR2. A simulation environment is set as each of the transistors TR1 and TR2 consume a power Q1 at t1, a power Q2 at t2, and a power Q3 at t3.

At t1, temperatures of nodes (e.g., drain, channel, gate, source, and a substrate) of each of the transistors TR1 and TR2 rise due to the power consumption Q1. At t1, the nodes of the transistor TR1 are set with a drain temperature Td, a channel temperature Tch, a gate temperature Tg, a source temperature Ts, and a substrate temperature Tsub. The drain temperature Td is highest, and the substrate temperature Tsub is lowest. This temperature increase may be applied to the transistor TR2.

At t2, temperatures of nodes (e.g., drain, channel, gate, source, and a substrate) of each of the transistors TR1 and TR2 again rise due to the power consumption Q2. However, as power consumption increases as compared with t1, temperature increments of the nodes (e.g., drain, channel, gate, source, and a substrate) also increase.

At t3, temperatures of nodes (e.g., drain, channel, gate, source, and a substrate) of each of the transistors TR1 and TR2 further rise due to the power consumption Q3. Temperature increments of the nodes (e.g., drain, channel, gate, source, and a substrate) also increase due to the great power consumption Q3 as compared with t2.

The transistors TR1 and TR2 are disposed at different positions on the layout. For example, the transistor TR1 is placed at an input state, and the transistor TR2 is placed to be adjacent to transistors where self-heating occurs. Thus, in the terms of the layout, temperatures of nodes (e.g., drain, channel, gate, source, and a substrate) of the transistor TR2 may be higher than those of the transistor TR1.

A temperature condition considering the layout of element may be estimated by use of simulation performed after the layout.

While the application has been described with reference to exemplary embodiments, it will be apparent to those skilled in the art that various changes and modifications may be made without departing from the spirit and scope of the present application. Therefore, it should be understood that the above embodiments are not limiting, but illustrative.

What is claimed is:

1. A method, executed by a computer, of designing a semiconductor circuit using a circuit simulation tool, the method comprising:
    applying the circuit simulation tool to an electric netlist in a first simulation of the semiconductor circuit's operation to calculate power consumptions of elements of the semiconductor circuit;
    creating a thermal netlist about the semiconductor circuit, based on the power consumptions and geometry information of each of the elements, by replacing an electrical resistance of each of the elements within the electric netlist with a thermal resistance or a thermal capacitance;
    applying the circuit simulation tool to the thermal netlist in a second simulation of the semiconductor circuit's operation to detect a temperature of each of the elements during the second simulation of the semiconductor circuit's operation;
    generating a revised electric netlist of the semiconductor circuit by revising the electric netlist based on the temperature of each of the elements of the semiconductor circuit;
    applying the circuit simulation tool to the revised electric netlist in a third simulation of the semiconductor circuit's operation to determine a simulation result of the semiconductor circuit's operation with respect to both the power consumptions and temperatures of the elements of the semiconductor circuit; and
    modifying the semiconductor circuit, based upon the simulation result, to create a modified semiconductor circuit having improved performance with respect to self-heating than the semiconductor circuit, wherein
    the thermal netlist includes thermal capacitance information of each of the elements.

2. The method of claim 1, further comprising:
    replacing the electrical resistance of at least one of the elements of the electric netlist with the thermal resistance, wherein
    the thermal resistance is determined based on geometry information and material characteristic information of the at least one element.

3. The method of claim 2, further comprising:
    replacing the electrical resistance of at least one other of the elements of the electric netlist with the thermal capacitance, wherein
    the thermal capacitance is determined based on a value of the thermal resistance for the at least one other element and a time constant.

4. The method of claim 1, wherein in creating the thermal netlist, the power consumptions are provided as a power parameter of the thermal netlist.

5. The method of claim 1, wherein in detecting the temperature, the circuit simulation tool indicates a temperature of each of nodes constituting an electrical circuit with a voltage output value of each of nodes constituting a thermal circuit.

6. A method of designing a semiconductor circuit using a circuit simulation tool executed by an information processing device, the method comprising:
    receiving a first netlist of the semiconductor circuit, material information of elements included in the semiconductor circuit, and geometry information of the elements included in the semiconductor circuit;
    conducting a first simulation of the semiconductor circuit's operation with the first netlist using the circuit simulation tool;
    creating a second netlist, corresponding to a thermal circuit representation of the semiconductor circuit depending on at least one of power consumptions of the elements generated according to the first simulation, the material information and the geometry information, by replacing an electrical resistance of each of the elements within the first netlist with a thermal resistance or a thermal capacitance;
    performing a second simulation of the semiconductor circuit's operation with the second netlist using the circuit simulation tool to detect temperature variations of the elements;
    revising the first netlist based on the temperature variations to create a third netlist;
    performing a third simulation of the semiconductor circuit's operation with the third netlist using the circuit simulation tool to determine a simulation result of the semiconductor circuit's operation with respect to both the temperature variations of the elements of the semiconductor circuit and at least one of the power consumptions of the elements, the material information, and the geometry information; and
    modifying the semiconductor circuit, based upon the simulation result, to create a modified semiconductor circuit having improved performance with respect to self-heating than the semiconductor circuit, wherein
    the thermal circuit representation includes a thermal capacitance parameter for detecting the temperature variations of the elements dynamically.

7. The method of claim 6, wherein the first netlist and the third netlist correspond to an electrical circuit of the semiconductor circuit.

8. The method of claim 6, wherein in creating the second netlist, a transistor is modeled with a source node, a channel node, a drain node, a gate node, and either at least one thermal resistance or at least one thermal capacitance connecting bulk nodes.

9. The method of claim 8, wherein:
    a first thermal resistance and a first thermal capacitance are connected in parallel between the channel node and the source node, and
    a second thermal resistance and a second thermal capacitance are connected in parallel between the channel node and the drain node.

10. A method, executed by a computer running a simulation program, of simulating an electrical circuit, the method comprising:
    simulating an electrical operation of the electrical circuit, using an electrical representation of the electrical circuit, to identify a power dissipation of each of a plurality of elements of the electrical circuit;

generating a thermal representation of each of the elements, based on the power dissipation of each of the elements and characteristics of the elements, by replacing an electrical resistance of each of the elements within the electrical representation of the electrical circuit with a thermal resistance or a thermal capacitance;

simulating a thermal operation of the electrical circuit based on the thermal representation of each of the elements and the power dissipation of each of the elements;

generating a temperature characteristic for each of the elements based upon the simulation of the thermal operation;

simulating another electrical operation of the electrical circuit using the electrical representation of the electrical circuit and the temperature characteristics of the elements;

identifying a performance degradation of one or more of the elements from the simulation of the other electrical operation of the electrical circuit using the electrical representation of the electrical circuit and the temperature characteristics of the elements; and modifying the electrical circuit, based upon the performance degradation, to create a modified electrical circuit having improved performance with respect to self-heating than the electrical circuit.

11. The method of claim 10, wherein the thermal representation of each of the elements comprises a thermal resistance that indicates a temperature difference across the element for the power dissipation through the element.

12. The method of claim 11, wherein:
the thermal representation of each of the elements further comprises a thermal capacitance, wherein
the thermal capacitance and the thermal resistance indicate a variation of the temperature difference with time.

13. The method of claim 10, wherein the thermal operation is simulated by substituting the thermal representation of each of the elements for an electrical representation of the element in a repetition of simulating the electrical operation.

* * * * *